Patented Nov. 17, 1931

1,832,417

UNITED STATES PATENT OFFICE

WILLIAM J. O'BRIEN, OF BALTIMORE, MARYLAND, ASSIGNOR TO THE GLIDDEN COMPANY, OF CLEVELAND, OHIO, A CORPORATION OF OHIO

PIGMENT

No Drawing. Application filed February 1, 1928. Serial No. 251,225.

This application is a continuation-in-part of my application Ser. No. 195,148, filed May 28, 1927.

This invention relates to pigments and paints formed therewith.

Among the objects of this invention is the formation of a pigment which will yield a smooth and fine-grained film or coating when associated with ordinary liquid vehicles and spread as a surface coating.

A further object of this invention is the coating of pigment particles with a protective colloid whereby the properties of the pigment are modified and improved so that the pigment will form a smooth, easy-working paint that is free from agglomerates. The pigments so coated tend to remain in suspension in the paint vehicle for a much longer period of time than pigments not so treated.

Other, further and more specific objects of this invention will become readily apparent to persons skilled in the art from a consideration of the following description.

In the preparation of pigments by the methods heretofore employed, the resulting powdered pigment when incorporated with a vehicle, such as linseed oil or other drying and semi-drying oil, yields a paint surface which frequently is not as smooth and fine-grained as desired, due to the existence of agglomerated particles of the pigment. This agglomeration persists to an undesirable extent despite the grinding of the pigment in oil.

I have found that by adding suitable quantities of certain higher fatty acids (for example, stearic, margaric, palmitic acids, etc.) to a suspension of the pigment in water the tendency for the pigment particles to agglomerate is largely diminished, and when the pigment containing these fatty acids is ground in a vehicle as a paint, the paint film produced therefrom is smoother and freer from grains or coarse particles and results in a very smooth paint job. The effects of additions of small quantities of these fatty acids to the pigment may be attributed to a change in the surface tension of the individual particles of pigment by the presence of these fatty acids so that there is no longer any tendency for these particles to collect in clusters or agglomerates. It appears that the fatty acids coat the particles of pigment, acting as protective colloids and changing the surface tension of the particles so that they do not agglomerate.

The fatty acids which I have found preferable for this purpose are those having from 16 to 18 carbon atoms. The quantity of fatty acid employed in my special process may vary from 0.05% to 1% depending upon the pigment and fatty acid employed. When employing stearic, margaric or palmitic acid with a pigment such as lithopone, fatty acid equal to 0.1% of the weight of the pigment has been found very satisfactory.

A specific example of carrying out this invention is as follows: To a warm, wet slurry of lithopone in water there is added stearic acid equal to about 0.1% of the weight of lithopone, and the mixture is thoroughly mixed or ground, whereupon it is filter-pressed to remove the water, then dried and later ground in dry form. The resulting pigment on being ground in a suitable vehicle and treated in the usual manner for making paints will yield a product which when painted on a surface will form a very smooth and fine-grained paint film. If the pigment is fine enough, the desired effect with stearic acid may be accomplished by merely adding the suitable quantity of stearic acid to a slurry of lithopone in water, violently agitating the resulting mass, then filtering, drying and grinding in the usual manner. The pigment in this paint will remain suspended longer than pigments not so treated.

The fatty acid may be added either in molten state or as a solution or emulsion in water. I have found a tube mill very satisfactory in producing a thorough incorporation of pigment and fatty acid.

If desired, the fatty acid may be added to the lithopone after calcination of the latter and prior to the wet milling step in the ordinary process of manufacturing the lithopone. By this manner, the fatty acid becomes thoroughly incorporated in the lithopone, and the desired results are obtained. Also, mixture of two or more of these higher fatty acids may be used in lieu of a single fatty acid.

My new process of treating the pigments is to be clearly distinguished from the mere addition of stearic and oleic acids and certain salts of these acids to paints for the purpose of preventing settling and giving body to the paint. My process is designed for a different purpose; namely, the alteration of the properties of the pigment itself, which is brought about preliminary to the grinding of the pigment in oil. Furthermore where heretofore the oleic and stearic acids and their salts have been added to paints, amounts equal to from 1 to 2% of the total weight of the paint including the vehicle are necessary to accomplish the desired effect in the paint. By my process of treating the pigments, a very much smaller quantity of fatty acid will produce the totally different effect in the pigment itself, for usually with oleic, stearic, margaric or palmitic acid equal to 0.1% of the weight of the dry pigment I am able to accomplish the desired results.

My process finds suitable application for the treatment of other pigments besides lithopone; examples of some other pigments being white lead, whiting, iron reds, titanium pigments, blanc fixe, ground barytes, etc.

The present invention is not limited to the specific details set forth in the foregoing examples which should be construed as illustrative and not by way of limitation and in view of the numerous modifications which may be effected therein without departing from the spirit and scope of this invention, it is desired that only such limitations be imposed as are indicated in the appended claims.

I claim as my invention.

1. Lithopone in finely divided form and having means for preventing agglomeration of the pigment particles, said means being from 0.05 to 1% of the weight of lithopone and comprising a fatty acid having 16 to 18 carbon atoms as a protective colloid uniformly incorporated upon the individual particles of lithopone.

2. Lithopone in finely divided form and having means for preventing agglomeration of the pigment particles, said means being from 0.05 to 1% of the weight of lithopone and comprising stearic acid as a protective colloid upon the individual particles of lithopone.

In testimony whereof I affix my signature.

WILLIAM J. O'BRIEN.